United States Patent
Kando et al.

(10) Patent No.: US 7,236,433 B2
(45) Date of Patent: Jun. 26, 2007

(54) SYSTEM AND METHOD OF RECORDING AND REPRODUCING INFORMATION

(75) Inventors: Hidehiko Kando, Matsudo (JP); Harukazu Miyamoto, Higashimurayama (JP)

(73) Assignee: Hitachi, Ltd., Tokyo (JP)

( * ) Notice: Subject to any disclaimer, the term of this patent is extended or adjusted under 35 U.S.C. 154(b) by 436 days.

(21) Appl. No.: 10/464,742

(22) Filed: Jun. 19, 2003

(65) Prior Publication Data

US 2004/0022158 A1 Feb. 5, 2004

(30) Foreign Application Priority Data

Aug. 2, 2002 (JP) ............................ 2002-225486

(51) Int. Cl.
G11B 7/00 (2006.01)

(52) U.S. Cl. .................. 369/44.13; 369/116; 369/275.4

(58) Field of Classification Search ...................... None
See application file for complete search history.

(56) References Cited

U.S. PATENT DOCUMENTS

| | | | | |
|---|---|---|---|---|
| 5,530,688 A * | 6/1996 | Hurst et al. | ................. | 369/116 |
| 5,820,795 A * | 10/1998 | Takemori et al. | .......... | 264/1.36 |
| 5,822,292 A * | 10/1998 | Akutsu et al. | ......... | 369/112.02 |
| 5,903,529 A * | 5/1999 | Nishi et al. | .............. | 369/44.23 |
| 6,046,970 A * | 4/2000 | DeCusatis et al. | .......... | 369/116 |
| 6,275,458 B1 * | 8/2001 | Wong et al. | ............. | 369/47.19 |
| 6,310,851 B1 * | 10/2001 | Tobita et al. | ................ | 369/111 |
| 6,320,839 B1 * | 11/2001 | Tobita et al. | ............ | 369/275.4 |
| 6,370,092 B1 * | 4/2002 | Araki et al. | ............. | 369/44.23 |

FOREIGN PATENT DOCUMENTS

| | | |
|---|---|---|
| JP | 53-3202 | 6/1976 |
| JP | 63-214919 | 3/1987 |
| JP | 02-053223 | 8/1988 |
| JP | 05-314491 | 2/1992 |
| JP | 07-296426 | 4/1994 |
| JP | 08-315368 | 5/1995 |

OTHER PUBLICATIONS

Hiroyuki Arioka, Shuji Tsukamoto, Narutoshi Fukuzawa, Takashi Horai, and Hiroshi Take, "The First Dye Media for Multilevel Recording System", Technical Digest of International Symposium on Optical Memory 2001, Oct. 16-19, 2001, pp. 238-239.

Naoyasu Miyagawa and Masud Mansuripur, "Advanced Grey Scale Recording on Phase Change Optical Disks", Technical Digest of International Symposium on Optical Memory 2001, Oct. 16-19, 2001, pp. 240-241.

* cited by examiner

*Primary Examiner*—William Korzuch
*Assistant Examiner*—Tawfik Goma
(74) *Attorney, Agent, or Firm*—Reed Smith LLP; Stanley P. Fisher, Esq.; Juan Carlos A. Marquez, Esq.

(57) ABSTRACT

A method and apparatus for recording information by irradiating light onto a medium to form a recorded domain, and method and apparatus for reproducing the recorded information are provided. In one example of the method, a plurality of light spots are modulated synchronously and irradiated onto a recording medium so that the plurality of light spots have an overlapped region on the recording medium. Since the profile of the total energy of the plurality of light spots is varied when the intensities of the plurality of light spots are modulated synchronously, it is possible to move the position where the total energy becomes maximum to any position on the optical recording medium. Thus, by moving the maximum point of the total energy of light spots in a cross-track direction, information can be recorded in a wobbled manner.

9 Claims, 6 Drawing Sheets

TRACKING METHOD A (GROOVE)

TRACKING METHOD B (SAMPLE SERVO)

WOBBLE STRIPE METHOD B

FIG. 6A
BEAM-DIFFERENTIAL METHOD
FIG. 6B
DIFFRACTIVE PUSH-PULL METHOD
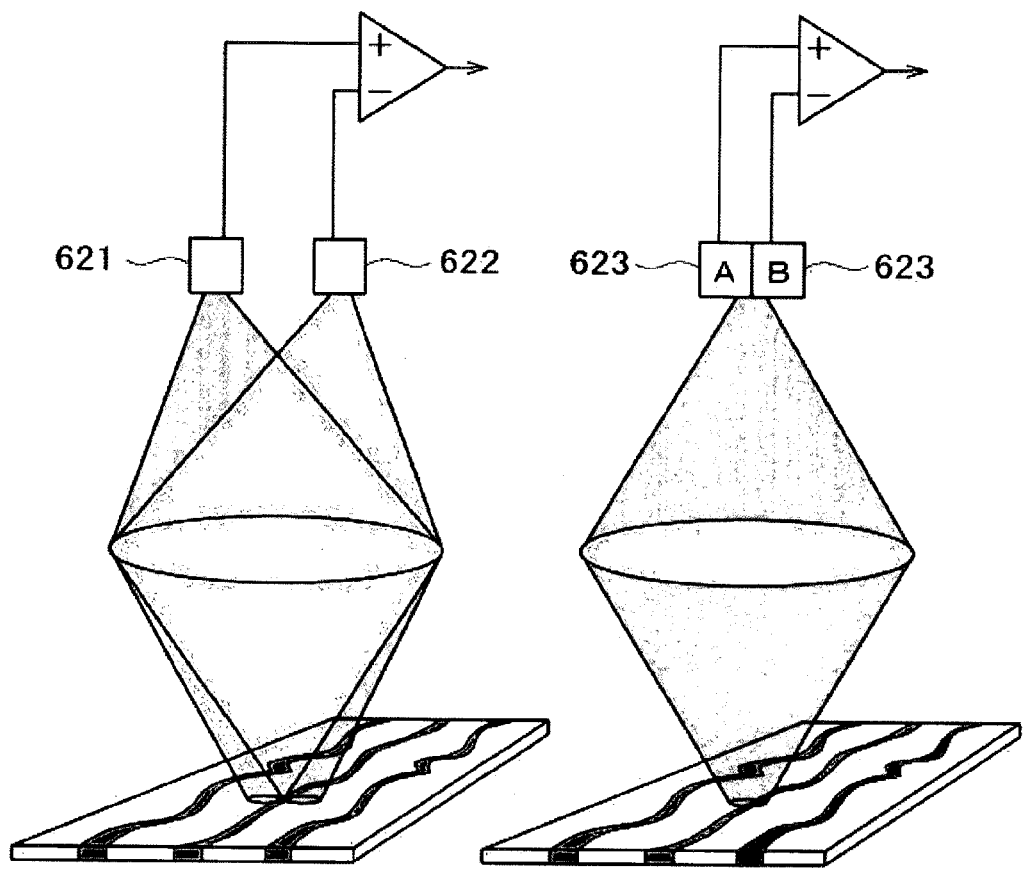
FIG. 7
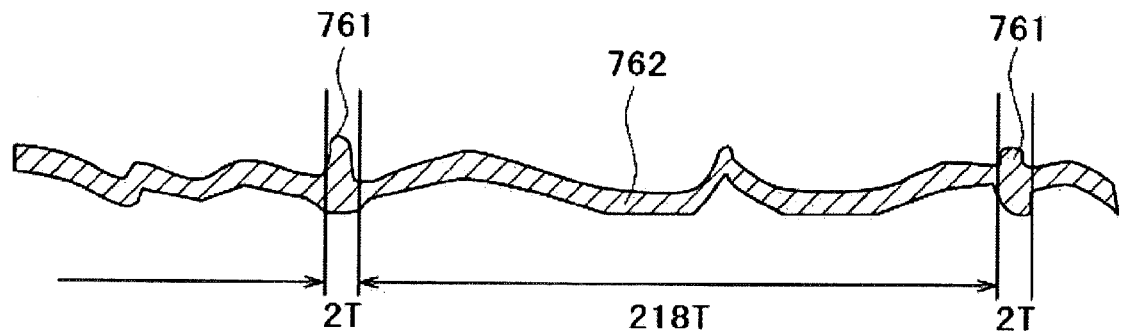

SYSTEM AND METHOD OF RECORDING AND REPRODUCING INFORMATION

COPYRIGHT-NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention generally relates to an information recording method and, more particularly to an information recording method using an information recording medium capable of recording information by exposure to energy beams, a method of reproducing the information recorded, and a system for recording and reproducing.

2. Discussion of Background

A recorded mark or domain is typically formed by irradiating a single laser beam onto a recording medium and changing the intensity of the laser beam or by changing a magnetic field to be applied to a recorded domain while maintaining the intensity of the laser beam at a fixed level.

Multilevel recording for increasing density is known. As described in Technical Digest of International Symposium on Optical Memory 2001, 2001, p. 238, the First Dye media for Multilevel Recording System, Arioka et al, and Advanced Gray Scale Recording on Phase Change Optical Disks, p 240 of the same document, the multilevel recording of a reproduction signal is effected by changing mainly the area of a recorded mark or domain.

As for the multilevel recording of a reproduction signal, it is known from Proceeding of Optical Data Storage 2000, SPIE Vol. 4090, 2000 that the multilevel recording of a reproduction signal is affected by providing recording information to a wobbled groove. This method pertains to ROM, which is mastered medium, and not used for recording.

In the above method in which a single beam is irradiated onto the medium, when the recording density is increased, the distance between recorded domains is shortened. When it becomes shorter than the thermal diffusion distance at the time of recording, a thermal interference occurs between the recorded domains. Therefore, there is limitation to the increase of recording density.

In the above method in which multilevel recording is carried out-to increase the recording density, when the size of a recorded domain is reduced to increase the density, the stability of forming a recorded domain is gradually lowered. Therefore, there is limitation to the increase of recording density as well.

SUMMARY OF THE INVENTION

It has been recognized that what is needed is high-density, stable recording. Broadly speaking, the present invention fills this need by providing a method and apparatus for recording information by irradiating light onto a medium to form a recorded domain, and a method and apparatus for reproducing the recorded information. It should be appreciated that the present invention can be implemented in numerous ways, including as a process, an apparatus, a system, a device or a method. Several inventive embodiments of the present invention are described below.

In one embodiment, a plurality of light spots are modulated synchronously and irradiated onto a recording medium so that the plurality of light spots have an overlapped region on the recording medium Since the profile of the total energy of the plurality of light spots is varied when the intensities of the plurality of light spots are modulated synchronously, it is possible to move the position where the total energy becomes maximum to any position on the optical recording medium. Therefore, by moving the maximum point of the total energy of light spots in a cross-track direction, information can be recorded in a wobbled manner.

By recording information in a wobbled manner, multilevel recording is made easy. That is, in the prior art multilevel recording system in which the area of a recorded domain is changed, the relationship between recording power and the intensity of a reproduction optical signal from a recorded domain formed by the recording power becomes nonlinear as shown in FIG. 4A, thereby making it difficult to control recording power for multilevel recording.

In contrast, FIG. 4B shows how the relationship between the difference in power between a plurality of energy beams and a wobbled detection signal (push-pull signal, etc.) becomes linear in the reproduction signal of an embodiment of the present invention. Advantageously, it is extremely easy to control recording for obtaining a predetermined reproduction signal required for multilevel recording.

Further, this system is particularly effective for multilevel recording. In this system, when a wobbled recorded mark is to be formed, the mark can be wobbled in a right or left direction from the center position by any amount and there is no restriction on the amount of a wobble. Since this makes it possible to form a wobbled recorded mark which reproduces a signal corresponding to any analog level (for example, a signal modulated into a sine wave form) faithfully on a disk medium, use of any multilevel recording system including analog recording is possible.

Since a lens does not need to be moved physically, the position at which the total energy of light spots becomes maximum can be moved at a very high speed. Theoretically, movement at a speed higher than the speed of light is possible. In this case, the actual moving speed of a substance or energy does not exceed the speed of light, but the position at which energy becomes maximum is seemingly moved, which is not against Einstein's principle of relativity. This can be understood from a phenomenon that when light is turned on and off between two different points, it looks like light moving from one point to another instantaneously but a light source itself does not actually move.

When the total power of a plurality of energy beams is to be complimentarily changed, a striped recorded domain which is stable to heat can be formed by maintaining the total energy of the plurality of energy beams at almost a fixed level. In this case, disorder in the striped form of the recorded domain is rare, a reproduction signal having little noise is obtained, and the number of levels can be increased, thereby making it possible to increase the recording density.

A system is known in which a plurality of optical beams are formed. The center axes of a plurality of optical beams are spaced apart from one another by a predetermined distance in a cross-track direction to synthesize a single light beam having an optical intensity profile with a flat top and a large gradient. However, in that system a plurality of light spots are neither modulated synchronously nor wobbled.

Advantageously, the present invention provides a system and method in which a plurality of light spots are modulated synchronously and wobbled.

The invention encompasses other embodiments of a method, an apparatus, and a computer-readable medium, which are configured as set forth above and with other features and alternatives.

BRIEF DESCRIPTION OF THE DRAWINGS

The present invention will be readily understood by the following detailed description in conjunction with the accompanying drawings. To facilitate this description, like reference numerals designate like structural elements.

FIG. 6A is a three-dimensional diagram of the reproduction system using beam-differential method, in accordance with an embodiment of the present invention;

FIG. 6B is a three-dimensional diagram of the reproduction system using diffractive push-pull method, in accordance with an embodiment of the present invention;

FIG. 7 is a diagram showing the shape of a recorded mark, in accordance with an embodiment of the present invention;

DESCRIPTION OF THE PREFERRED EMBODIMENTS

An invention is disclosed for a method and apparatus for recording information by irradiating light onto a medium to form a recorded domain, and method and apparatus for reproducing the recorded information. Numerous specific details are set forth in order to provide a thorough understanding of the present invention. It will be understood, however, to one skilled in the art, that the present invention may be practiced without some or all of these specific details.

Figure 1:
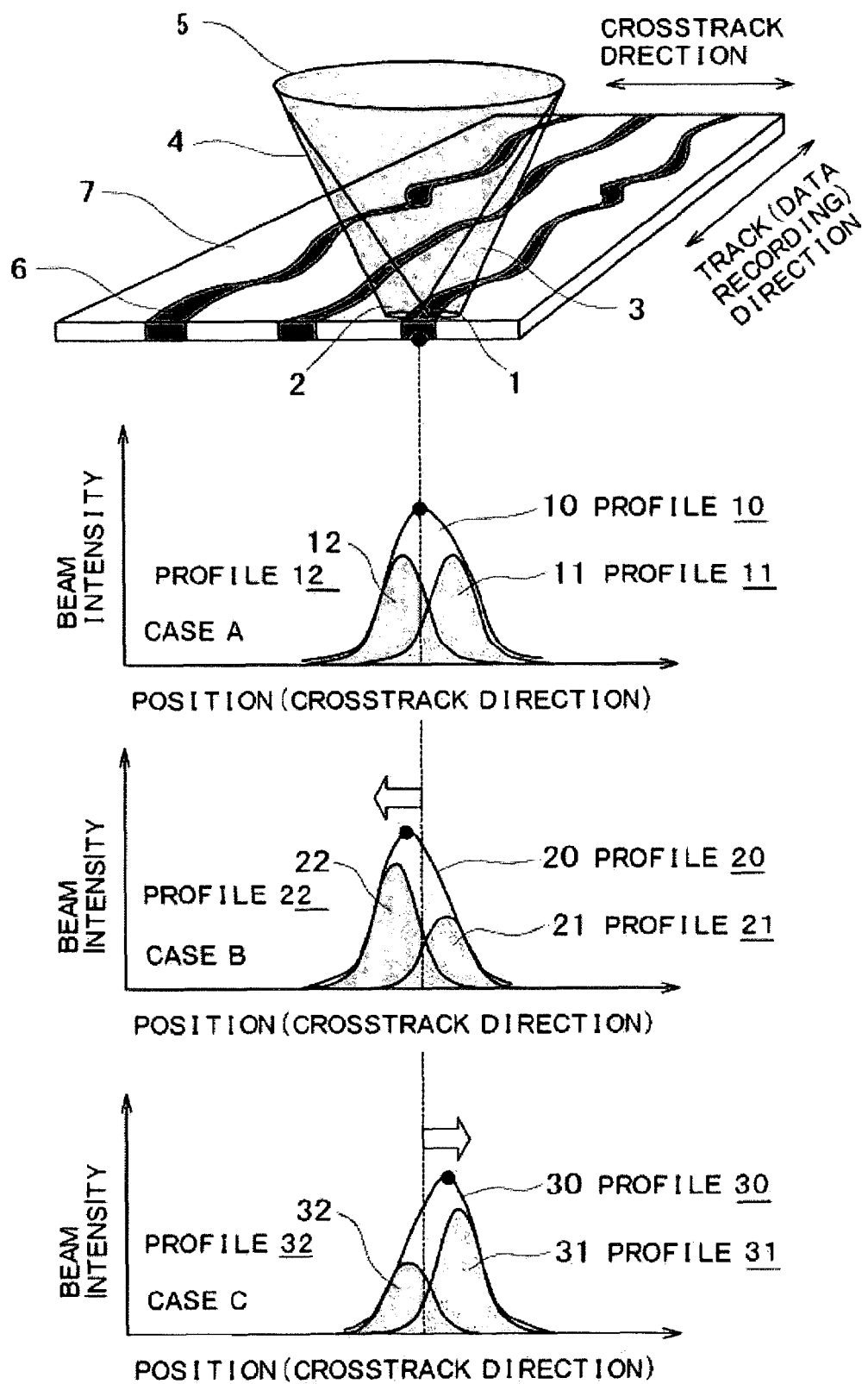
FIG. 1 shows a three-dimensional diagram of the irradiation process and explanatory graphs of beam intensity with respect to beam position, in accordance with an embodiment of the present invention.

FIG. 1 shows a three-dimensional diagram of the irradiation process and explanatory graphs of beam intensity with respect to beam position, in accordance with an embodiment of the present invention. Information is recorded by forming recorded domains 6 on the recording surface 7 of a recording medium in a data recording direction (track direction). A plurality of recorded domains 6 are existent in the cross-track direction (direction perpendicular to the track). That is, a plurality of recording tracks are formed. The recording surface 7 is made from a dye, phase-change material, metal, semiconductor, optical crystal, magneto-optical recording material or other substance whose optical properties are changed by exposure to an energy beam 3 and an energy beam 4. The energy beam 3 and the energy beam 4 are focused by an objective lens 5. The cross-sectional region 1 of the energy beam 3 and the recording surface 7 and the cross-sectional region 2 of the energy beam 4 and the recording surface 7 are existent in proximity to each other but do not completely overlap with each other and are shifted from each other with an overlapped portion. The shifting direction is not an information recording direction and needs to be at a significant angle from the information recording direction. In the case of FIG. 1, the region 1 and the region 2 are circles of the same size and shift from each other in a cross-track direction by 20% of the diameter of the circle.

The case A in FIG. 1 shows the intensity profiles of the energy beam 3 and the energy beam 4 on the recording surface 7 in the cross-track direction including the region 1 and the region 2. In this case, the intensity of the energy beam 3 and the intensity of the energy beam 4 are the same. The intensity profile of the energy beam 3 on the recording surface 7 is represented by 11, the intensity profile of the energy beam 4 on the recording surface 7 is represented by 12, and the total intensity profile of the energy beam 3 and the energy beam 4 is represented by 10.

The-case B of FIG. 1 shows the intensity profiles of the energy beam 3 and the energy beam 4 on the recording surface 7 in the cross-track direction including the region 1 and the region 2. In this case, the energy beam 4 has higher intensity than the energy beam 3. The intensity profile of the energy beam 3 on the recording surface 7 is represented by 21, the intensify profile-of the energy beam 4 on the recording surface 7 is represented by 22, and the total intensity profile of the energy beam 3 and the energy beam 4 is represented by 20. In this case, the profile 20 is substantially the same in size (peak value and total integral value) as the profile 10. The position in the cross-track direction of the peak of the profile 20 is shifted in the left direction of the figure from the position in the cross-track direction of the peak of the profile 10.

The case C of FIG. 1 shows the intensity profiles of the energy beam 3 and the energy beam 4 on the recording surface 7 in the cross-track direction including the region 1 and the region 2. In this case, the energy beam 3 has higher intensity than the energy beam 4. The intensity profile of the energy beam 3 on the recording surface 7 is represented by 31, the intensity profile of the energy beam 4 on the recording surface 7 is represented by 32, and the total intensity profile of the energy beam 3 and the energy beam 4 is represented by 30. In this case, the profile 30 is substantially the same in size (peak value and total integral value) as the profile 10. The position in the cross-track direction of the peak of the profile 30 is shifted in the right direction of the figure from the position in the cross-track direction of the peak of the profile 10.

The energy profile on the recording surface 7 can be changed to the profile 10, profile 20 or profile 30 at a high speed by switching the case A, case B and case C in an appropriate order. By moving the recording surface 7 relative to the energy beam 3 and the energy beam 4 in the information recording direction while carrying out this, the recorded domain 6 can be wobbled at a high speed. It is also possible to change the peak positions of these profiles while the profile 10, profile 20 and profile 30 are made substantially the same in size (peak value and total integral value) and to carry out thermally stable recording on the recording surface 7 at all times. This thermally stable writing to the recorded domain 6 (recorded mark) makes the width of the recorded domain 6 uniform and smoothens domain walls (mark end portions), thereby making it possible to write information stably on a domain (mark) which is always uniform in shape.

It is possible to create a large number of cases by subdividing the difference in intensity between the energy beam 3 and the energy beam 4. In this case, the multilevel recording of information is made possible with the result that a larger volume of information can be recorded. In this embodiment, information was recorded at a higher density by this multilevel recording.

When the energy beam 3 and the energy beam 4 have coherence, an interference fringe may be formed in an overlapped portion between the region 1 and the region 2. When this interference fringe must be removed, the polarization directions of the energy beam 3 and the energy beam 4 are made substantially perpendicular to each other or clockwise circular polarization light and counterclockwise circular polarization are irradiated. When the interference fringe is removed, the shapes of the profile 10, profile 20 and profile 30 become extremely stable and a stable recorded domain can be always formed, resulting in improved reliability.

Figure 5:
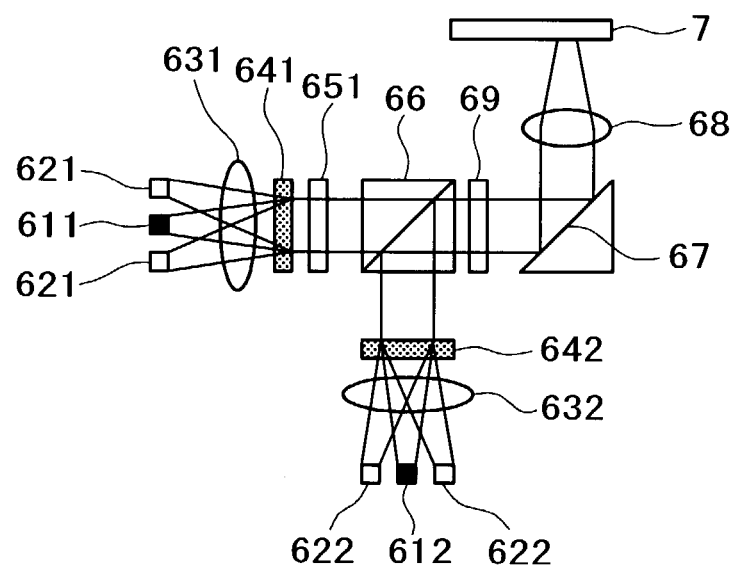
FIG. 5 is a diagram of an optical head system, in accordance with an embodiment of the present invention.

FIG. 5 shows the double-beam irradiation optics, in accordance with an embodiment of the present invention. Two beams are applied as clockwise circular polarization and counterclockwise circular polarization. Beams emitted from two laser diode light sources 611 and 612 are linear polarizations which pass through diffraction gratings 641 and 642, respectively, and the polarization plane of one of the beams is turned at 90° by a ½-wave plate 651. The two beams are combined into almost a single beam by a polarization beam splitter (PBS) 66. The polarization beam splitter (PBS) 66 reflects light in a polarization direction emitted from the laser 612 and transmits light in a polarization direction turned by the phase plate 651. The expression "almost a single" means that the angles of the two beams slightly differ from each other. The single beam is converted into circular polarization by a ¼-wave phase plate 69. Since the polarization planes of beams from the light source 611 and the light source 612 are perpendicular to each other, the two beams are converted into clockwise circular polarization and counterclockwise circular polarization, respectively. A "polarization conversion device" preferably includes the double-beam irradiation optical devices of FIG. 5, but is not limited thereto.

Thereafter, the beams are irradiated onto the medium 7 through a 45° mirror 67 and an objective lens 68 to form two circular polarization spots. The circular polarization spots shift from each other by the above slight difference in angle. Even in the overlapped portion between the two beams, there is no possibility that the beams interfere with each other to deform the shapes of their spots as the beams differ in polarization state. When light is reflected by the recording medium 7, the clockwise circular polarization is converted into counterclockwise circular polarization and the counterclockwise circular polarization is converted into clockwise circular polarization by the effect of the mirror. Accordingly, reflected light is polarized in a direction perpendicular to its original polarization direction when it passes through the ¼-wave phase plate 69 with the result that it is returned in a direction different from that of the original light source by the polarization beam splitter (PBS). The returned light is introduced into a divided detector, including first detectors 621 and second detectors 622, by the diffraction gratings and added to a reproduction signal or a push-pull signal to generate a servo signal for auto-focusing or tracking. In this embodiment, the positional relationship between the two spots is adjusted at a position where the ¼-wave phase plate 69 is slightly turned from its original position. Such adjustment may be performed by collimating lenses 631 and 632. Thereby, returned beams from the two beams are not completely separated and input into the same detectors 621 and 622. Accordingly, by adjusting the positions of the beams on the detector, the positions of the two beams can be accurately set. In fact, as the difference between the positions of the two spots can be calculated from the amplitude of a push-pull signal obtained by turning on and off the two beams on the push-pull detector, the positions of the beams are automatically adjusted by making use of this in this embodiment. A "position adjustment device" preferably includes collimating lens 631 or 632, but is not limited thereto.

In this embodiment, two laser diodes having a wavelength of 405 nm are used as light sources, beams are collected on a recording medium by an objective lens having a numerical aperture (NA) of 0.85 to form a pair of adjacent light spots. The diameter of each spot is about 450 nm, the interval between the spots is 90 nm which is 20% of the diameter of the spot, and the two spots shift from each other by 90 nm in the cross-track direction. Therefore, the remaining 360 nm portions of the spots overlap with each other. In this embodiment, a quadrant amplitude modulation (QAM) system is used to produce a recording signal. First, recording data is converted into two trains of N-value digital information ($I_k$, $Q_k$; k=0, 1, 2 . . . ). Since information is an N value, a value from 0 to N−1 is taken. The recording signal is converted as follows according to the above two trains of digital information.

$$S(t)=\Sigma\{2\times I_k-(N-1)\}\cdot \mathrm{Sin}(2\pi t/T)\cdot w(t-K\cdot T)+\Sigma\{2\times Q_k-(N-1)\}\cdot \mathrm{Cos}(2\pi t/T)\cdot w(t-K\cdot T)$$

In the above equation, Σ is the total of k, T is the length of a symbol, and w is a window function. In this example, a rectangular window function is used as w so to ensure that $w(t)=1(0\leq t <T)$ and $w(t)=0(t<0, T\leq t)$ In this embodiment, N=6. Each train consists of 6 values, that is, one symbol consists of 36 values as a whole. As for conversion from the above recording data to two trains of 6value digital information, 5-bit recording data corresponds to 36 values, that is, one symbol. Since 5 bits are equal to 32 values, the remaining 4 values are used for the phase synchronization of recording data and automatic gain control. According to the above S(t), the center position of a light beam is changed to form a wobbled mark on the optical recording medium 7.

In this embodiment, recording was carried out at T=35 ns and a linear speed of 10 m/sec. Therefore, on the recording medium, the length of one symbol is equivalent to 380 nm.

Accordingly, the bit length is 75 nm. The track pitch is 280 nm. The width of the formed wobbled recorded mark is about 120 nm, and the amplitude of the wobble is 60 nmpp.

For the reproduction of information, one or both of the energy beam 3 and the energy beam 4 are irradiated onto the recording surface 7 after their energies are made lower than in the cases A to C, and a change in the profile of reflected light (or transmitted light) in the cross-track direction is detected, whereby the wobble of the recorded domain 6 can be detected, thereby reproducing information. There are two detection methods (FIG. 6). One of the methods is a beam-differential method (a) in which two beams are irradiated at the same time and the difference between the amounts of their reflections is taken as a signal and the other is a diffractive push-pull method (b) in which the difference between right and left reflections of a single beam is taken as a signal. The diffractive push-pull method has been used to detect a wobble signal or tracking signal but cannot be used when the recorded mark is a black-and-white type mark which does not generate an optical phase difference as there is no phase difference between reflections. Then, the beam-differential method (a) was used in this embodiment.

Figure 8A:
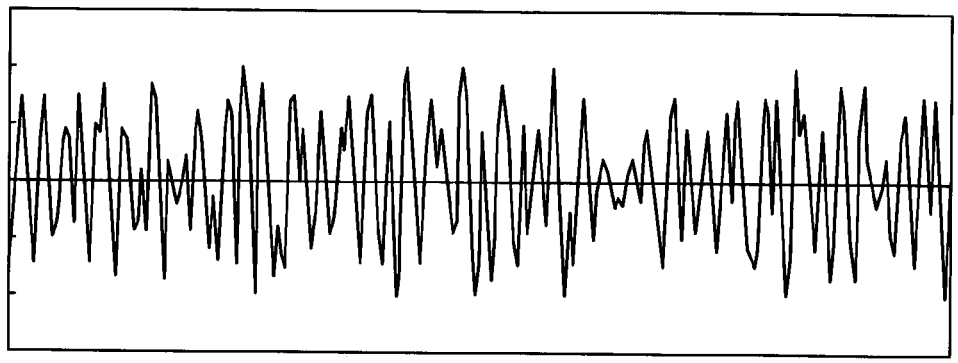
FIG. 8A is a graph of reproduction signal, in accordance with an embodiment of the present invention.

FIG. 8A shows a reproduction signal, in accordance with an embodiment of the present invention. This reproduction signal is equalized to correct the frequency characteristics of a reproduction system because the intensity of a high-frequency signal is lowered by the influence of the resolution of a reproduction light spot and then demodulated.

In this embodiment, equalization is carried out only at the time of reproduction but pre-equalization may be carried out at the time of recording. In this case, nonlinearity which slightly occurs in the recording step can also be corrected. Therefore, this method is suitable for higher-density recording.

Figure 8B:
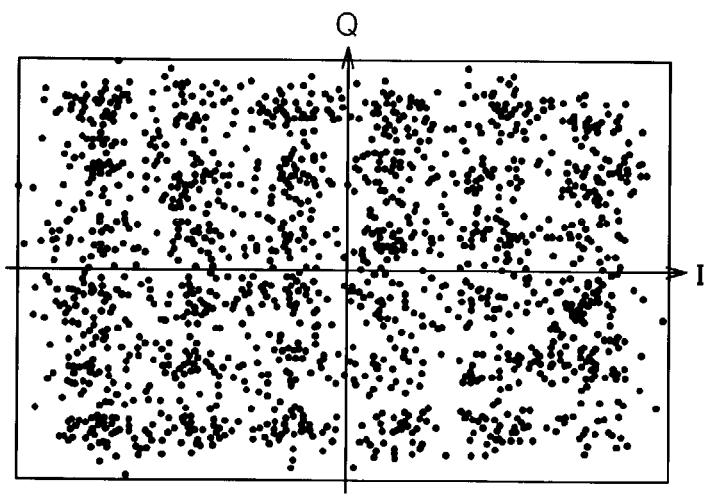
FIG. 8B is a graph of demodulation results of a reproduction signal in which equalization was not carried out and a demodulation signal could not separated, in accordance with an embodiment of the present invention.
Figure 8C:
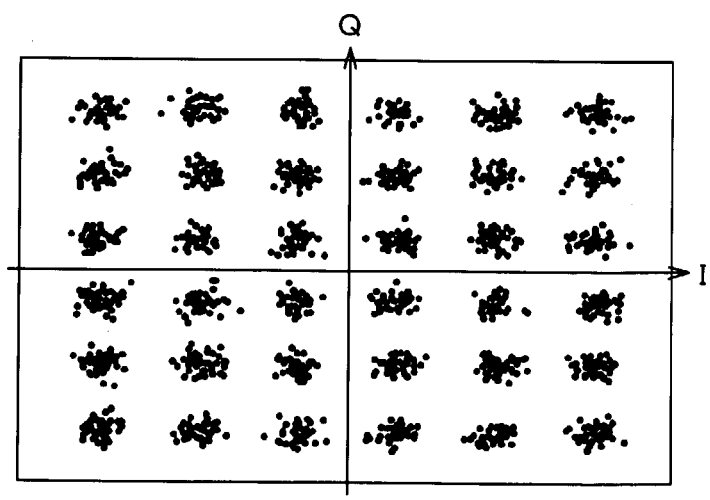
FIG. 8C is a graph of demodulation results of the reproduction system of FIG. 8A in which a demodulation signal could be separated, in accordance with an embodiment of the present invention.

Integrated output values may be obtained. Two reference waves $\sin(2\pi t/T)$ and $\cos(2\pi t/T)$) are multiplied by the above reproduction signal to obtain two results. The two results are then integrated for each time duration T by plotting the two results on a vertical axis and a horizontal axis corresponding to the above two trains ($I_k$ and $Q_k$), respectively. The plot is used to demodulate the reproduction signal shown in FIG. 8A. The demodulation results of this integration are shown in FIG. 8C. It can be understood from the results that 36-value information was reproduced. FIG. 8B shows an example of demodulation results in which equalization was not carried out and a signal could not be separated. The above results are based on the assumption that the profile 10, profile 20 and profile 30 are substantially the same in size.

In contrast to this, there is a case where the sizes of the profile 10, profile 20 and profile 30 are changed intentionally. This change makes it possible to alter the width of the recorded domain 6. Or, the recorded domain 6 cannot be formed partially. The existence of the recorded domain 6 and a change in the width of the recorded domain 6 may be used as a signal for synchronizing the wobbling of the recorded domain 6 or to record additional information (for example, address information or security information for copyright protection) on the recorded domain. This makes it possible to improve the integrity and accessibility of recorded data. In fact, when the reproduction signal of FIG. 8A is to be demodulated, reference waves must be formed and multiplied by the reproduction signal as described above. The reference waves must be perfectly synchronous with the reproduction signal in phase and frequency. In this embodiment, as shown in FIG. 7, a synchronization mark portion 761 which is rectangular and larger in width is formed at a frequency of once every 220T. Since this thick portion differs from the mark 762 of an ordinary data portion in width, reflectance changes in that portion at the time of reproduction. Therefore, the synchronization mark portion 761 having a different reflectance can be easily discriminated from the ordinary wobbled portion 762. Since this synchronization mark appears every 220T, the reference signal can be easily synchronized with the reproduction signal in phase and frequency by aligning the phase of a pulse obtained by dividing the reference signal by 220 with that of the synchronization mark. In other words, the synchronization mark detection signal is multiplied by 220 to generate a reference (clock) signal.

Although three cases, case A, case B and case C, have been described, binary modulation is possible with case B and case C. In this case, the control of a change in the intensity of an energy beam becomes easy and reliability can be improved by the simplification of a system. Although the effect of increasing density is not obtained in the binary modulation portion, as the portion has high reliability, it is suitable for use as a recording portion for system information such as file management information and recording area management information which require particularly high reliability in a recording system. In this embodiment, information is recorded by this binary recording system in the about 0.5% area of the total of the innermost portion and the outermost portion of a disk and these portions are used to record file management, defect management and recording area management information. In this embodiment, about 50 GB data can be recorded on one side of a 120 mm-diameter disk. The 0.5% area of the disk is equivalent to 250 MB which is large enough as a management information area.

Figure 2A:
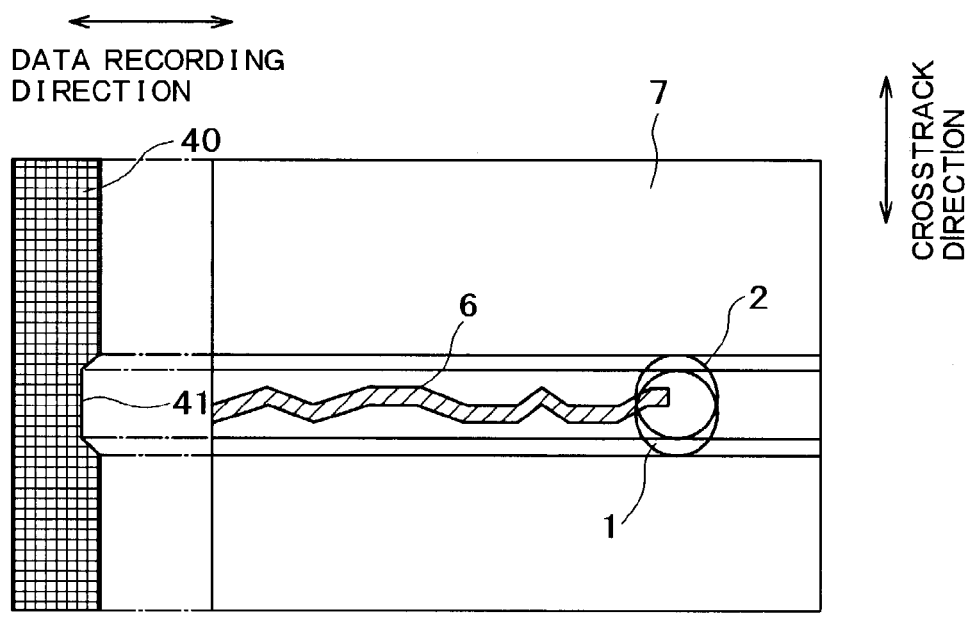
FIG. 2A is a partially enlarged view of the embodiment of FIG. 1, in accordance with an embodiment of the present invention.
Figure 2B:
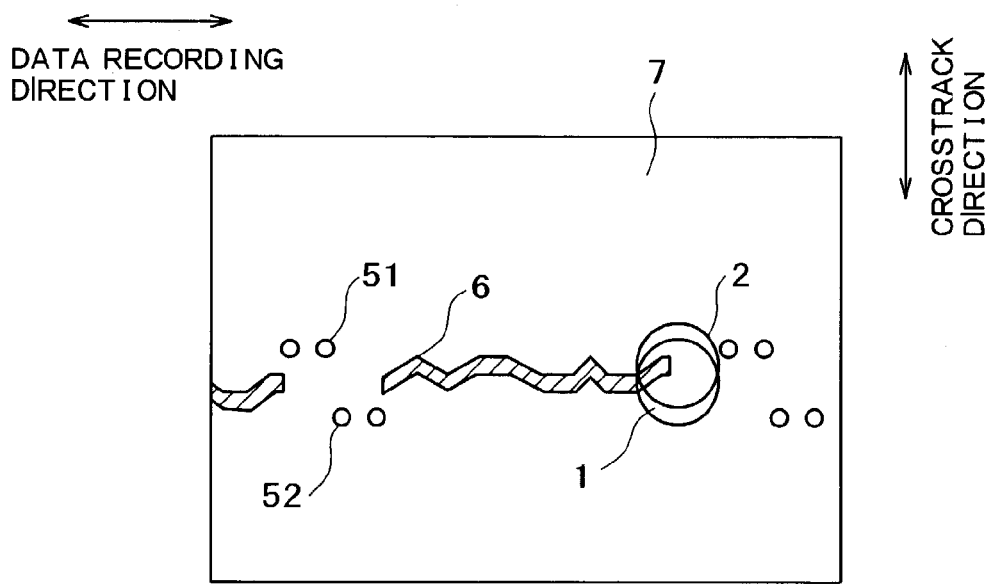
FIG. 2B is a partially enlarged view of the embodiment of FIG. 1, in accordance with an embodiment of the present invention.

The tracking method in the embodiment of FIG. 1 will be described with reference to FIGS. 2A and 2B. FIGS. 2A and 2B are partially enlarged views of the recording surface 7 and the recorded domain 6 of FIG. 1. In FIGS. 2A and 2B, the recorded domain 6 is formed on the recording surface 7. As examples of the tracking method, tracking method A and tracking method B will be described below.

The tracking method A will be described with reference to FIG. 2A. A groove 41 is partially formed in the section 40 of the recording surface 7 shown in FIG. 2A. An energy beam 1 and an energy beam 2 are irradiated onto this groove (or ridge) to detect reflected light or transmitted light. A change (push-pull signal) in the profile of the intensity of reflected light or transmitted light in the cross-track direction is detected from the detection result and the positions of the energy beam 1 and the energy beam 2 in the cross-track direction are adjusted so that the change becomes constant, thereby making it always possible to form a recorded domain 6 at an anticipated position. Address information representing the physical position of the groove 41 can be provided to the groove 41 by wobbling the groove 41 in the cross-track direction or changing the width of the groove 41 in the cross-track direction. In this case, the positioning of the energy beams becomes easy.

The tracking method B will be then described with reference to FIG. 2B. Wobble marks 51 and wobble marks 52 are formed on the recording surface 7 of FIG. 2B in advance. The wobble marks 51 and the wobble marks 52 shift from each other in the cross-track direction. A sample servo tracking signal is formed from a push-pull signal when the energy beam 1 and the energy beam 2 pass by the wobble marks 51 and the wobble marks 52, by detecting a change in the total amount of transmitted light or reflected light. By controlling the signal at a constant tracking, a recorded domain 6 is formed at an anticipated position. It is conceivable that the recorded domain 6 is not formed in portions where the wobble marks 51 and the wobble marks 52 are formed. This can be made possible by forming these marks on the recording surface so that the wobble marks 51 and the wobble marks 52 always appear at a regular cycle and not recording information during a certain period out of this regular cycle. In this case, the read reliability of the wobble marks 51 and the wobble marks 52 is improved. A fixed pattern is provided to the wobble marks 51 and the wobble marks 52 so that address information representing the physical positions of the wobble marks can be provided. In this case, the positioning of the wobble marks 51 and the wobble marks 52 becomes easy. The wobble marks 51 and the wobble marks 52 may be formed as pre-pits. In this case, the wobble marks 51 and the wobble marks 52 are not erased and a correct servo signal is always obtained, thereby improving reliability.

Figure 3:
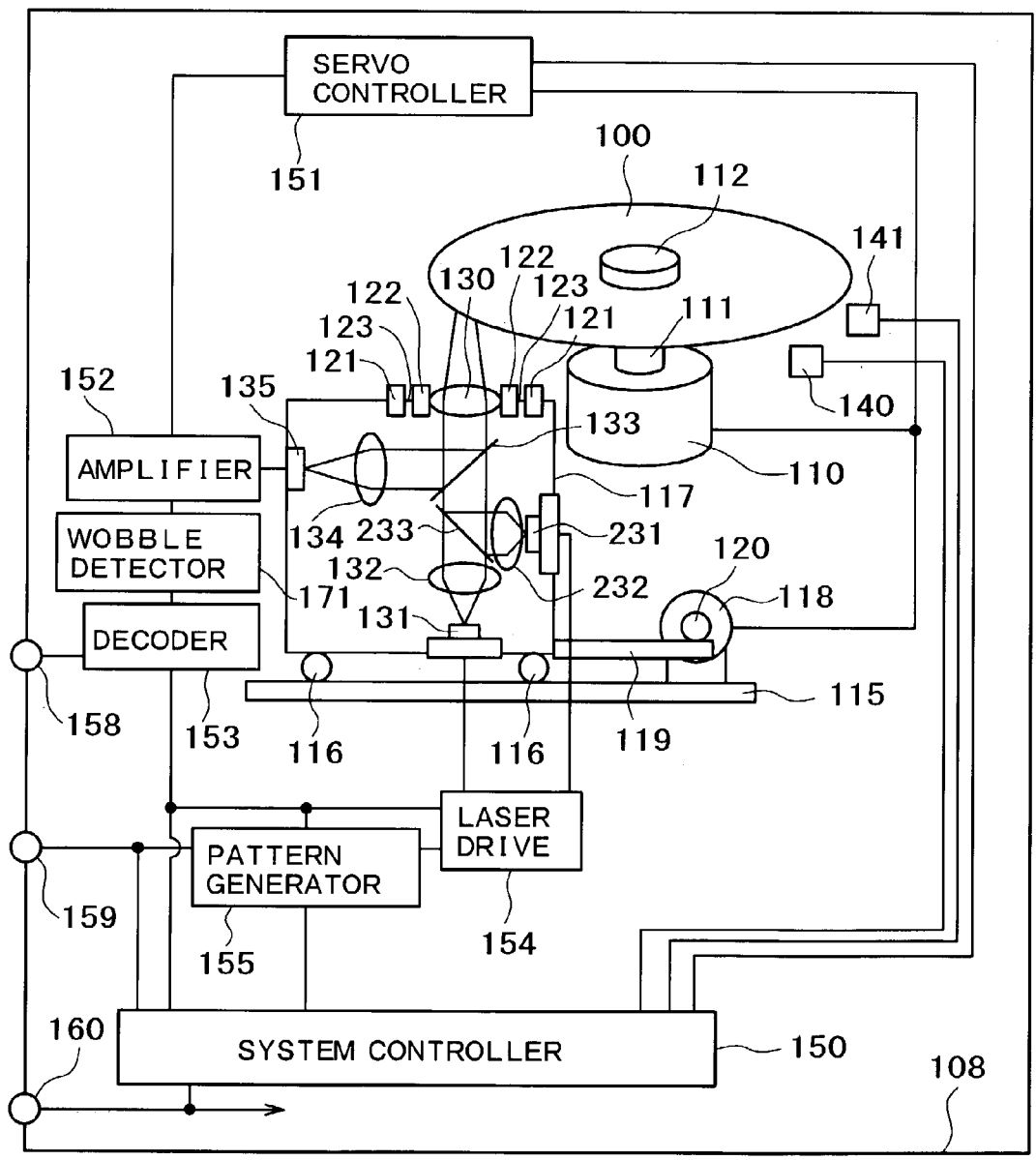
FIG. 3 shows the irradiation system, in accordance with an embodiment of the present invention.
Figure 4A:
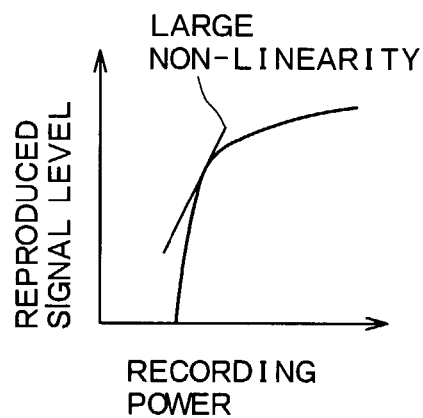
FIG. 4A (PRIOR ART) is a graph showing how the relationship between recording power and the intensity of a reproduction optical signal from a recorded domain formed by the recording power becomes nonlinear.
Figure 4B:
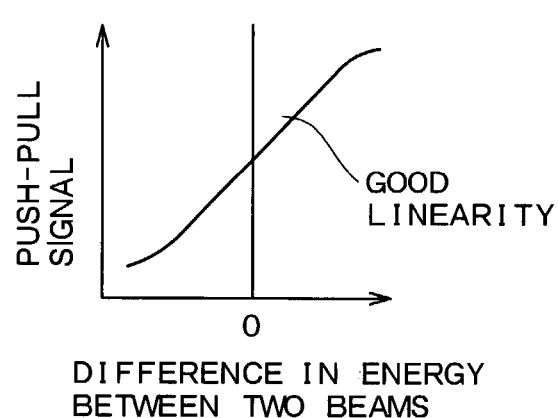
FIG. 4B shows how the relationship between the difference in power between a plurality of energy beams and a wobbled detection signal (push-pull signal, etc.) becomes linear in the reproduction signal of an embodiment of the present invention.

FIG. 3 shows the irradiation system, in accordance with an embodiment of the present invention. The shaft 111 of a motor 110 mounted in a case 108 is fitted with a chucking 112 which holds a recording medium 100. The chucking 112 is a holder for the recording medium 100. The motor 110, shaft 111 and chucking 112 constitute a moving unit for moving the recording medium 100 and energy beams relative to each other.

The case 108 is provided with a rail 115. A case 117 is provided with rail guides 116 guided along the rail 115. The case 117 is also provided with a rack 119 which is attached to a pinion 120. The rotation of a motor 118 mounted in the case 108 is transmitted to the pinion 120 so that the case 117 moves along the rail 115 linearly. The direction of this linear movement is substantially the radial direction of the recording medium 100. A "moving device" preferably includes the motor, but is not limited thereto.

The case 117 is provided with magnets 121. The case 117 is also provided with an objective lens 130 through suspensions 123 which can move the objective lens 130 only in substantially the normal direction of the recording surface of the recording medium 100 and substantially the radial direction of the recording medium 100. The objective lens 130 is connected to coils 122 which are substantially opposite to the respective magnets 121. By applying a current to the coils 122, the objective lens 130 can move in substantially the normal direction of the recording surface of the recording medium 100 and substantially the radial direction of the recording medium 100 by the effect of magnetic force. The rail 115, rail guides 116, case 117, magnets 121, suspensions 123, coils 122 and objective lens 130 constitute a positioning unit for positioning an energy beam at a predetermined location on the recording medium 100. An "irradiation device" preferably includes laser diode 131 and laser diode 231, but is not limited thereto.

A laser diode 131 and a laser diode 231 which are energy beam generators are installed in the case 117. An energy beam emitted from the laser diode 131 is converted into substantially a parallel beam by a collimating lens 132 and passes through a beam splitter 233. An energy beam emitted from the laser diode 231 is-converted into substantially a parallel beam by a collimating lens 232 and reflected by the beams splitter 233. The positions of the laser diode 131, collimating lens 132, laser diode 231, collimating lens 232 and beam splitter 233 are adjusted to ensure that the optical axis of the beam emitted from the laser diode 131 and passing through the beam splitter 233 and the optical axis of the beam emitted from the laser diode 231 and reflected by the beam splitter 233 are not perfectly parallel to each other and form a small angle. The beams emitted from the laser diode 131 and the laser diode 231 pass through a beam splitter 133 and the objective lens 130 and form focal points on the recording surface of the recording medium 100. Since the optical axis of light emitted from the laser diode 131 and the optical axis of light emitted from the laser diode 231 form a small angle, the focal spots on the recording surface slightly differ from each other. This difference is in substantially the radial direction of the recording medium.

Part of light irradiated from the objective lens 130 is reflected by the recording medium 100, passes through the objective lens 130, reflected by the beam splitter 133 and collected by a detection lens 134 so that its light intensity is detected by a photodetector 135. The photo-detection area of the photodetector 135 is divided into a plurality of sub-areas. The intensity of light detected in each photo-detection sub-area is amplified by an amplifier 152 and calculated to detect information (servo signal) on the relative position relationship between the light spots formed by the objective lens 130 and the recording medium 100 and an information read signal. A "power adjustment device" preferably includes the amplifier 152, but is not limited thereto. The servo signal is transmitted to a servo controller 151. The read signal is transmitted to a decoder 153 through a wobble detection circuit 171.

When the recording medium 100 is mounted on an information recording/reproducing system and fixed by the chucking 112, a detector 140 is activated to transmit its signal to a system controller 150. In response to the signal, the system controller 150 controls the motor 110 to turn the recording medium 100 at an appropriate revolution. The system controller 150 also controls the motor 118 to position the case 117 at an appropriate location. The system controller 150 causes the laser diodes 131 and 231 to emit light and activates the servo controller 151 to operate the motor 118 and apply a current to the coils 122 to position focusing spots formed by the objective lens 130 at predetermined locations on the recording medium 100. The servo controller 151 transmits a signal informing that the focusing spots are formed on the recording medium 100 to the system controller 150. The system controller 150 gives the decoder 153 an instruction to decode a signal to be read. When the track to be read is not an information track in the control data zone, the system controller 150 gives the servo controller 151 an instruction to position the focusing spots on the information track of the control data zone. As the result of the above operation, the system controller 150 reads the information track in the control data zone to read medium information for recording or reproduction.

When an information write instruction or information to be written is transmitted from a host controller through an input connector 159, the system controller 150 gives the servo controller 151 an instruction to position the focusing spots on an appropriate track on the recording medium 100. Information to be written is transmitted to a pattern generating circuit 155. The pattern generating circuit 155 arranges information on a user data area to be recorded in a sector, an incidental recording information field (buffer or other field) before the user data area and an incidental recording information field (buffer or other field) after the user data area in accordance with the method of arranging recording information in the sector specified by the system controller 150 and completes patterns of recording information fields in the sector. The pattern generating circuit 155 transmits its formed recording patterns to a laser driver circuit 154 one after another. The laser driver circuit 154 changes current values to be injected into the laser diode 131 and the laser diode 231 according to a recorded mark pattern to be written transmitted from the pattern generating circuit 155. A "power change device" preferably includes the laser driver circuit 154, but is not limited thereto. The total of currents to be injected into the laser diode 131 and the laser diode 231 is maintained at a fixed level and the ratio of currents to be applied to the laser diodes is changed. Beams emitted from the laser diode 131 and the laser diode 231 are irradiated onto the recording medium 100 through the objective lens 136, thereby forming a recorded domain on the recording medium. The method of forming a recorded domain is the same as the method described with reference to FIG. 1.

When an instruction for the reproduction of information is transmitted from the host controller through the input connector 159, the system controller 150 gives the servo controller 151 an instruction to position focusing spots on an appropriate track on the recording medium 100. A signal obtained by the photodetector 135 is amplified by the amplifier 152, a reproduction signal is transmitted to the system controller 150 through the wobble detector 171 and the decoder 153, and information read through an output connector 158 is transmitted to the host controller.

An information recording/reproducing system which can always form a stable recorded domain and has high reliability can be constructed by the above constitution. A high-density information recording/reproducing system can be constructed by multilevel recording.

As means of irradiating two light spots, a laser having the function of changing the direction or angle of a beam may be used in place of the above-described method. In this case, although the constitution and adjustment of optics become simple, the laser itself becomes complicated. The method may be selected by comparing the production cost of a laser and the adjustment cost of optics. In either case, the above-described density increasing effect of the present invention can be obtained as well. A stable high recording density can be obtained by the above constitution.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of recording information by irradiating light onto a medium to form a recorded domain, the method comprising:
    forming a first light spot and a second light spot in a crosstrack direction of the medium such that the first light spot and the second light spot share an overlapped area, the overlapped area being continuous in a track direction; and
    irradiating the first light spot and the second light spot onto the medium to record information while changing the intensities of the first light spot and the second light spot synchronously such that the recorded domain is wobbled from side to side, wherein a total intensity of the first light spot and the second light spot is substantially fixed during recording.

2. An information recording apparatus for recording information on a medium, the information recording apparatus comprising:
    an irradiation device configured to irradiate a plurality of light spots onto the medium, the plurality of light spots being arranged in a crosstrack direction of the medium;
    a power adjustment device configured to adjust power levels of the plurality of light spots;
    a position adjustment device configured to adjust positions of the plurality of light spots;
    a power change device configured to change power levels of the plurality of light spots synchronously to form a continuous recording region with wobbling from side to side;
    a moving device configured to move the irradiation device relative to the medium; and
    a power adjustment device configured to adjust the total power of the plurality of light spots to a substantially fixed value during recording, wherein the recording is multilevel recording.

3. A method of recording information by irradiating light onto a medium to form a recorded domain, the method comprising:
    forming a first light spot and a second light spot in a crosstrack direction of the medium such that the first light spot and the second light spot share an overlapped area, the overlapped area being continuous in a track direction; and
    irradiating the first light spot and the second light spot onto the medium to record information while changing the intensities of the first light spot and the second light spot synchronously such that the recorded domain is wobbled from side to side, wherein a total intensity of the first light spot and the second light spot is substantially fixed during recording, and
the recording is multilevel recording.

4. The method according to claim 1, further comprising the step of modulating a difference in power between a plurality of beams in multilevels.

5. The method according to claim 1, wherein the recording signal is produced by a quadrant amplitude modulation (QAM) system.

6. The information recording apparatus according to claim 2, further comprising a modulator configured to modulate a difference in power between a plurality of beams in multilevels.

7. The information recording apparatus according to claim 2, wherein the recording signal is produced by a quadrant amplitude modulation (QAM) system.

8. The method according to claim 3, further comprising the step of modulating a difference in power between a plurality of beams in multilevels.

9. The method according to claim 3, wherein the recording signal is produced by a quadrant amplitude modulation (QAM) system.

* * * * *